United States Patent
Lee et al.

(10) Patent No.: US 12,107,443 B2
(45) Date of Patent: *Oct. 1, 2024

(54) ELECTRONIC DEVICE AND METHOD FOR TRANSMISSION OF REASON WIRELESS CHARGING IS STOPPING

(71) Applicant: Samsung Electronics Co., Ltd., Gyeonggi-do (KR)

(72) Inventors: Wooram Lee, Gyeonggi-do (KR); Hyungjun Kwon, Gyeonggi-do (KR); Yusu Kim, Gyeonggi-do (KR); Kyungmin Park, Gyeonggi-do (KR); Juhyang Lee, Gyeonggi-do (KR); Byungyeol Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

This patent is subject to a terminal disclaimer.

(21) Appl. No.: 17/509,263

(22) Filed: Oct. 25, 2021

(65) Prior Publication Data

US 2022/0045556 A1 Feb. 10, 2022

Related U.S. Application Data

(63) Continuation of application No. 16/246,726, filed on Jan. 14, 2019, now Pat. No. 11,159,064.

(30) Foreign Application Priority Data

Jan. 15, 2018 (KR) .................. 10-2018-0005286

(51) Int. Cl.
*H02J 7/00* (2006.01)
*H02J 50/10* (2016.01)
(Continued)

(52) U.S. Cl.
CPC ............ *H02J 50/80* (2016.02); *H02J 7/0031* (2013.01); *H02J 50/10* (2016.02); *H02J 50/12* (2016.02);
(Continued)

(58) Field of Classification Search
USPC ................................................. 320/106, 108
See application file for complete search history.

(56) References Cited

U.S. PATENT DOCUMENTS

2012/0281547 A1  11/2012  Kim et al.
2012/0313579 A1*  12/2012  Matsumoto ......... H02J 7/00304
                                                                320/108
(Continued)

FOREIGN PATENT DOCUMENTS

CN  103843221 A  6/2014
CN  104995815 A  10/2015
(Continued)

OTHER PUBLICATIONS

Korean Office Action dated Oct. 13, 2022.
(Continued)

*Primary Examiner* — Samuel Berhanu
(74) *Attorney, Agent, or Firm* — Cha & Reiter, LLC

(57) ABSTRACT

An electronic device may include a display, a power reception circuit, and a processor. The processor may perform wireless charging by receiving power wirelessly from an external electronic device through the power reception circuit, and receive data on one or more reasons to stop wireless charging from the external electronic device during the wireless charging. Also, the processor may transmit acknowledge (ACK) data to the external electronic device in response to receiving the data on the one or more reasons to stop wireless charging, and display, through the display, at least one reason to stop wireless charging included in the
(Continued)

data on the one or more reasons to stop wireless charging. Other embodiments are possible.

16 Claims, 9 Drawing Sheets

(51) Int. Cl.
| | |
|---|---|
| *H02J 50/12* | (2016.01) |
| *H02J 50/60* | (2016.01) |
| *H02J 50/80* | (2016.01) |
| *H04B 5/79* | (2024.01) |
| *H04L 5/00* | (2006.01) |

(52) U.S. Cl.
CPC ............... *H02J 50/60* (2016.02); *H04B 5/79* (2024.01); *H04L 5/0055* (2013.01); *H02J 7/00304* (2020.01)

(56) References Cited

U.S. PATENT DOCUMENTS

| | | | |
|---|---|---|---|
| 2013/0082651 A1 | 4/2013 | Park et al. | |
| 2014/0111153 A1 | 4/2014 | Kwon et al. | |
| 2014/0292094 A1 | 10/2014 | Tsukamoto et al. | |
| 2014/0312852 A1* | 10/2014 | Won | H02J 7/00308 |
| | | | 320/137 |
| 2016/0006263 A1 | 1/2016 | Shichino | |
| 2016/0099578 A1* | 4/2016 | Hwang | H02J 7/00 |
| | | | 307/104 |
| 2016/0336759 A1 | 11/2016 | Yamamoto et al. | |
| 2017/0093212 A1 | 3/2017 | Nagamine | |
| 2017/0288738 A1 | 10/2017 | Lee et al. | |
| 2017/0324279 A1* | 11/2017 | Kang | H02J 50/80 |
| 2017/0331334 A1* | 11/2017 | Park | H02J 50/12 |
| 2018/0097403 A1 | 4/2018 | Jung | |
| 2018/0205257 A1 | 7/2018 | Kwon et al. | |
| 2018/0219428 A1 | 8/2018 | Bae | |
| 2018/0257502 A1* | 9/2018 | Park | H02J 50/10 |
| 2018/0316229 A1* | 11/2018 | Anwer | H02J 50/60 |
| 2018/0351407 A1 | 12/2018 | Ogishima et al. | |
| 2019/0028148 A1 | 1/2019 | Louis | |
| 2019/0131826 A1 | 5/2019 | Park et al. | |
| 2019/0148987 A1 | 5/2019 | Jung | |
| 2019/0260241 A1* | 8/2019 | Park | H04L 63/0823 |

FOREIGN PATENT DOCUMENTS

| | | |
|---|---|---|
| CN | 105122576 A | 12/2015 |
| CN | 107005094 A | 8/2017 |
| JP | 2017-70020 A | 4/2017 |
| JP | 2017-93140 A | 5/2017 |
| KR | 10-2014-0050516 A | 4/2014 |
| KR | 10-2016-0114490 A | 10/2016 |
| KR | 10-2017-0016171 A | 2/2017 |
| KR | 10-2017-0021011 A | 2/2017 |
| KR | 10-2017-0040509 A | 4/2017 |
| KR | 10-2017-0112900 A | 10/2017 |
| KR | 10-2017-0118571 A | 10/2017 |
| KR | 10-2017-0135492 A | 12/2017 |
| WO | 2017/057911 A1 | 4/2017 |
| WO | 2017/176128 A1 | 10/2017 |
| WO | 2017/213428 A1 | 12/2017 |

OTHER PUBLICATIONS

Korean Office Action dated Apr. 12, 2023.
Indian Office Action dated Jan. 11, 2024.
Chinese Office Action dated Oct. 30, 2023.
Korean Decision of Patent dated Nov. 27, 2023.

* cited by examiner

FIG. 6

| COM | Value | Match |
|---|---|---|
| 0x05 | 0x12 | TX-OTP |
| | 0x13 | TX-OCP |
| | 0x14 | Darkzone |
| | 0x20 | FOD (Diff.<300mW) |
| | 0x21 | FOD (300<Diff.<500mW) |
| | 0x22 | FOD (500<Diff.<1000mW) |
| | 0x23 | FOD (1000<Diff.<1500mW) |
| | 0x24 | FOD (1500<Diff.<2000mW) |
| | 0x25 | FOD (2000<Diff.<2500mW) |
| | 0x26 | FOD (2500<Diff.<3000mW) |
| | 0x27 | FOD (3000mW<Diff.) |
| | 0x28~0xFF | Reserved |

ELECTRONIC DEVICE AND METHOD FOR TRANSMISSION OF REASON WIRELESS CHARGING IS STOPPING

CROSS-REFERENCE TO RELATED APPLICATION(S)

This application is a Continuation of Ser. No. 16/246,726 filed on Jan. 14, 2019 which is based on and claims priority under 35 U.S.C. § 119 to Korean Patent Application No. 10-2018-0005286, filed on Jan. 15, 2018, in the Korean Intellectual Property Office, the disclosure of which is incorporated by reference herein in its entirety.

BACKGROUND

1. Technical Field

The disclosure relates to an electronic device and method for transmission of a reason for stopping wireless charging.

2. Description of Related Art

Recently, wireless charging techniques based on electromagnetic induction or magnetic resonance have been applied to electronic devices such as smart phones. When a power receiver (or a "PRX," e.g., a smart phone) comes in contact with a power transmitter (or "PTX," e.g., a wireless charging pad) or is within a certain distance of the power transmitter, the battery of the power receiver can be charged due to the electromagnetic induction or magnetic resonance between the transmission coil of the power transmitter and the reception coil of the power receiver.

While wireless charging process is performed between the power transmitter and the power receiver, the power transmitter may stop transmitting the power to the power receiver, for example, due to some disruptive event. In this case, conventionally the user does not know why the wireless charging is stopped, or may be unaware that wireless charging has stopped. Therefore, the user may continue to place the power receiver in contact with or near the power transmitter, under the impression that the power receiver is being charged, and may be disappointed after elapse of a specific time period to discover that the power receiver was not being charged. Additionally, even when the user is aware that the power receiver is not charging, the lack of feedback regarding why the power receiver is not charging may result in user's dissatisfaction with the quality and usability of the wireless charging function of the power receiver.

SUMMARY

According to an embodiment of the disclosure, an electronic device may comprise a display; a power reception circuit; and a processor configured to perform wireless charging by receiving power wirelessly from an external electronic device through the power reception circuit, receive data on one or more reasons to stop wireless charging from the external electronic device during the wireless charging, transmit acknowledge (ACK) data to the external electronic device in response to receiving the data on the one or more reasons to stop wireless charging, and display, through the display, at least one reason to stop wireless charging stop reason included in the data on the one or more reasons to stop wireless charging.

According to an embodiment of the disclosure, a method performed by an electronic device may comprise performing wireless charging by receiving power wirelessly from an external electronic device through a power reception circuit; receiving data on one or more reasons to stop wireless charging from the external electronic device during the wireless charging; transmitting acknowledge (ACK) data to the external electronic device in response to the receiving the data on the one or more reasons to stop wireless charging; and displaying, through a display, at least one reason to stop wireless charging included in the data on the one or more reasons to stop wireless charging.

According to an embodiment of the disclosure, an electronic device may comprise a power transmission circuit; and a processor configured to perform wireless power transfer by transmitting power wirelessly to an external electronic device through the power transmission circuit, detect a reason to stop wireless charging during the wireless power transfer, transmit data on the reason to stop wireless charging to the external electronic device, and stop the wireless power transfer after elapse of a predetermined time period from the transmitting of the data on the reason to stop wireless charging.

According to an embodiment of the disclosure, when a situation for stopping power transfer between a power transmitter and a power receiver arises during the wireless charging process, the power transmitter can transmit a reason for stopping the charging to the power receiver and, after an elapse of a certain time period, stop the power transfer. This provides helpful feedback to the user regarding the operations of the wireless charging process. In addition, by collecting various reasons wireless charging stopped, it is possible to improve the quality and usability of wireless charging between the power transmitter and the power receiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of an embodiment of the disclosure of the present disclosure will be more apparent from the following description taken in conjunction with the accompanying drawings, in which:

FIG. 6 is a diagram illustrating data representing a reason for stopping wireless charging according to an embodiment of the present disclosure.

DETAILED DESCRIPTION

Figure 1:
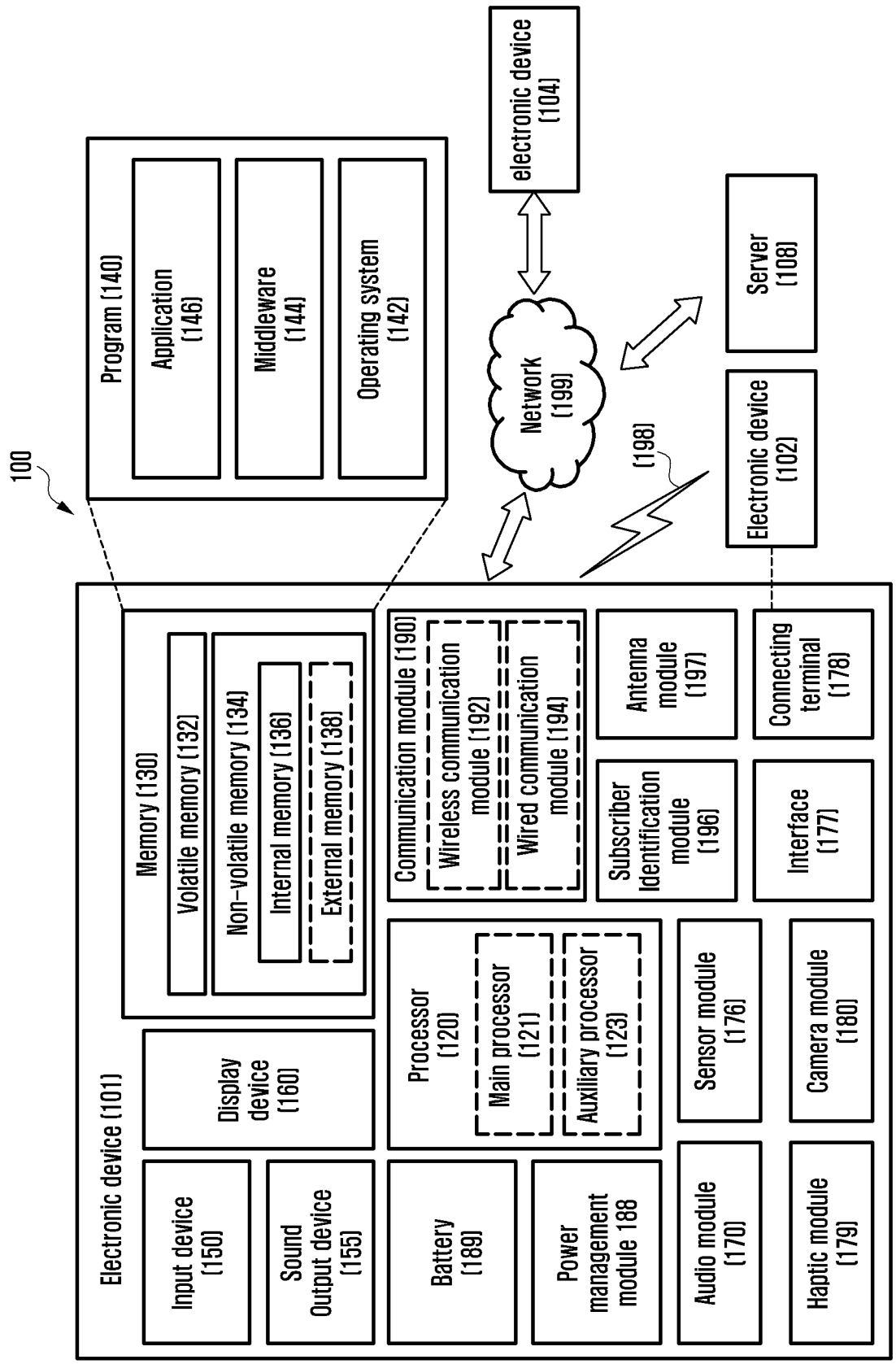
FIG. 1 is a block diagram of an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
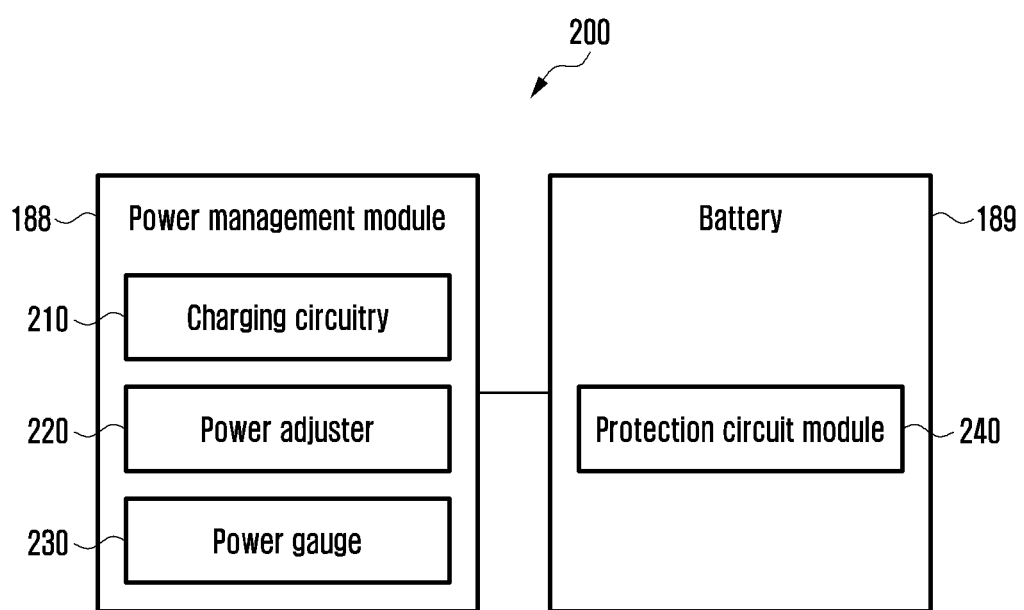
FIG. 2 is a block diagram illustrating a power management module and a battery of an electronic device according to an embodiment of the present disclosure.

FIG. 2 is a block diagram 200 illustrating the power management module 188 and the battery 189 according to an embodiment of the present disclosure. Referring to FIG. 2, the power management module 188 may include charging circuitry 210, a power adjuster 220, or a power gauge 230. The charging circuitry 210 may charge the battery 189 by using power supplied from an external power source external to the electronic device 101. According to an embodiment, the charging circuitry 210 may select a charging scheme (e.g., normal charging or quick charging) based at least in part on the type of the external power source (e.g., types such as power outlet, USB, or wireless charging), the magnitude of power suppliable from the external power source (e.g., 20 Watt or more), and/or an attribute of the battery 189. The charging circuitry 210 may then charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting the voltage level or the current level of the power supplied from the external power source or the battery 189. The power adjuster 220 may adjust the voltage level or the current level of the power supplied from the external power source or the battery 189 into a different voltage level or current level appropriate for at least one of the components included in the electronic device 101. According to an embodiment, the power adjuster 220 may be implemented in the form of a low drop out (LDO) regulator or a switching regulator. The power gauge 230 may measure use state information about the battery 189 (e.g., capacity, the number of times the battery 189 has been charged or discharged, voltage of the battery 189, temperature of the battery 189, etc.).

The power management module 188 may determine, using, for example, the charging circuitry 210, the power adjuster 220, or the power gauge 230, charging state information (e.g., lifetime, over voltage, low voltage, over current, over charge, over discharge, overheat, short-circuit, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120). The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The battery 189, according to an embodiment, may include a protection circuit module (PCM) 240. The PCM 240 may perform one or more functions, such as a charge cutoff function, to prevent deterioration or damage to the battery 189. The PCM 240, additionally or alternatively, may be configured as at least part of a battery management system (BMS) capable of performing various functions such as cell balancing, measurement of battery capacity, counting the number of charges or discharges, measurement of temperature, and measurement of voltage.

According to an embodiment, parts of the charging state information or use state information regarding the battery 189 may be measured using corresponding sensors (e.g., a temperature sensor) of the sensor module 176, the power gauge 230, or the power management module 188. According to an embodiment, the corresponding sensors of the sensor module 176 may be included as part of the PCM 240, or may be disposed near the battery 189 as separate devices.

Figure 3:
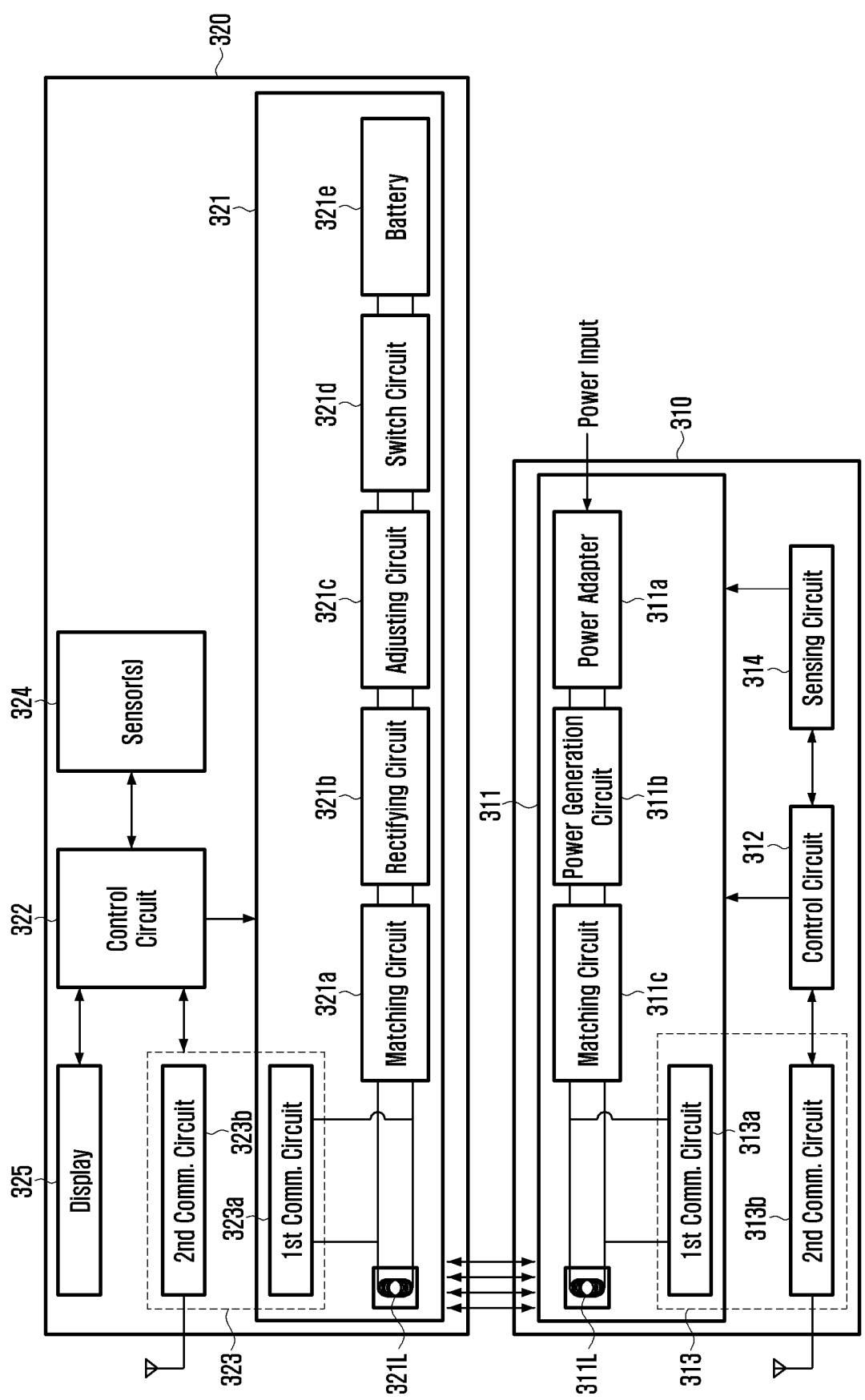
FIG. 3 is a block diagram illustrating a wireless charging environment according to an embodiment of the present disclosure.

FIG. 3 is a block diagram illustrating a wireless charging environment according to an embodiment of the present disclosure.

Referring to FIG. 3, in one embodiment, a power transmitter 310 (e.g., the electronic device 102 of FIG. 1) may include a power generation circuit 311, a control circuit 312, a communication circuit 313, and a sensing circuit 314.

In one embodiment, the power generation circuit 311 may include a power adapter 311a, a power generation circuit 311b, and a matching circuit 311c. The power adapter 311a receives a power input from a power source and appropriately converts the voltage of the power input. The power generation circuit 311b generates power. The matching circuit 311c adjusts the efficiency between the transmission coil 311L and the reception coil 321L of a power receiver 320.

In one embodiment, the control circuit 312 performs the overall control of the power transmitter 310 and may generate and deliver various messages required for wireless power transfer to the communication circuit 313. In one embodiment, the control circuit 312 may calculate the amount of power to be transmitted to the power receiver 320 (e.g., the electronic device 101 of FIG. 1), based on information received from the communication circuit 313. In one embodiment, the control circuit 312 may control the power generation circuit 311 to transmit the calculated amount of power to the power receiver 320 through the transmission coil 311L.

In one embodiment, the communication circuit 313 may include at least one of a first communication circuit 313a and a second communication circuit 313b. The first communication circuit 313a may communicate with a first communication circuit 323a of the power receiver 320 by using the same frequency as the frequency used for power transfer between the transmission coil 311L and the reception coil 321L (e.g., in-band communication). In another embodiment, the second communication circuit 313b may communicate with a second communication circuit 323b of the power receiver 320 by using a frequency different from the frequency used for power transfer between the transmission coil 311L and the reception coil 321L (e.g., out-band communication). For example, the second communication circuit 313b may acquire information (e.g., $V_{rec}$ information (e.g., received voltage), $I_{out}$ information (e.g., output current), various packets, messages, etc.) associated with the charging state from the second communication circuit 323b by using one of various short-range communication techniques such as Bluetooth, BLE, Wi-Fi, and NFC.

In one embodiment, the sensing circuit 314 may measure the state of the power transmitter 310.

In one embodiment, the sensing circuit 314 may include a first sensing circuit for sensing the temperature, motion state, etc. of the power transmitter 310.

In one embodiment, the sensing circuit 314 may include a second sensing circuit capable of measuring a signal in the power generation circuit 311. Specifically, the second sensing circuit may measure signals in one or more of the transmission coil 311L, the matching circuit 311c, or the power generation circuit 311b. For example, the second sensing circuit may measure a signal at the front end of the transmission coil.

In one embodiment, the power receiver 320 may include a power reception circuit 321, a control circuit 322 (e.g., the processor 120 of FIG. 1), a communication circuit 323 (e.g., the communication module 190 of FIG. 1), at least one sensor 324 (e.g., the sensor module 176 of FIG. 1), and a display 325 (e.g., the display device 160 of FIG. 1). In the power receiver 320, some components corresponding to those of the power transmitter 310 may be omitted below.

In one embodiment, the power reception circuit 321 may include a reception coil 321L for wirelessly receiving power from the power transmitter 310, a matching circuit 321a, a rectifying circuit 321b for rectifying received AC power to DC power, an adjusting circuit 321c for adjusting the charging voltage, a switch circuit 321d, and a battery 321e.

In one embodiment, the control circuit 322 performs the overall control of the power receiver 320 and may generate and deliver various messages required for wireless power transfer to the communication circuit 323.

In one embodiment, the communication circuit 323 may include at least one of a first communication circuit 323a and a second communication circuit 323b. The first communication circuit 323a may communicate with the power transmitter 310 via the reception coil 321L. The second communication circuit 323b may communicate with the power transmitter 310 by using one of various short-range communication techniques such as Bluetooth, BLE, Wi-Fi, and NFC. For example, the communication circuit 323 may receive data regarding the reason charging is stopping from the power transmitter 310.

In addition, the power receiver 320 may further include the at least one sensor 324 such as a current/voltage sensor, a temperature sensor, an illuminance sensor, or a sound sensor, and the display 325.

Figure 4:
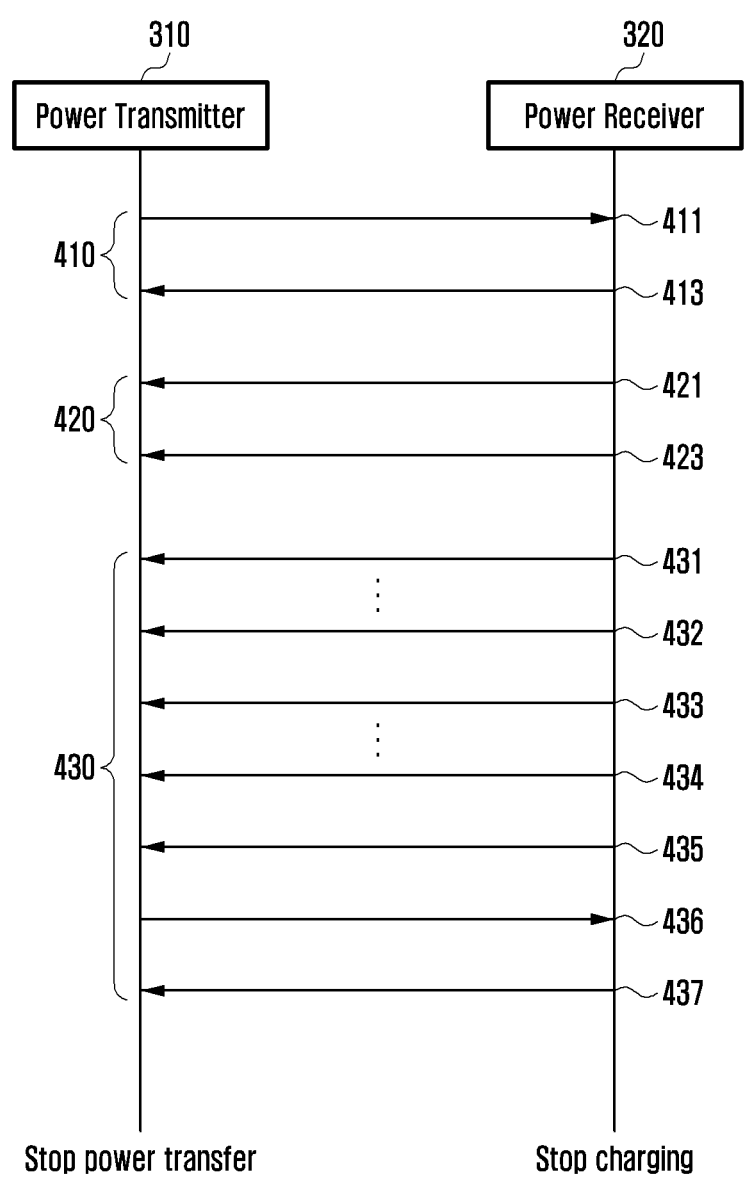
FIG. 4 is a flow diagram illustrating a wireless charging process and a wireless charging stop process between an electronic device and an external electronic device according to an embodiment of the present disclosure.

FIG. 4 is a flow diagram illustrating a wireless charging process and a wireless charging stop process between an electronic device and an external electronic device according to an embodiment of the present disclosure.

Referring to FIG. 4, in an embodiment, the power transmitter 310 (e.g., a wireless charger, a wireless charging pad, an external electronic device, etc.) may transmit power wirelessly to the power receiver 320 (e.g., a mobile terminal, a smart phone, an electronic device, etc.). The power transmitter 310 may control the power transfer, based on information received from the power receiver 320 and/or information calculated and acquired autonomously. For example, wireless charging process performed between the power transmitter 310 and the power receiver 320 may include a ping phase 410, an identification and configuration phase 420, and a power transfer phase 430.

According to an embodiment, at operation 411, the power transmitter 310 may transmit ping data to the power receiver 320 in order to check whether wireless power transfer is available. At operation 413, the power receiver 320 may transmit data regarding the signal strength of the ping data to the power transmitter 310 in response to receiving the ping data. According to an embodiment, at operation 413, the power receiver 320 may transmit a response signal corresponding to the reception of the ping data to the power transmitter 310.

According to an embodiment, at operation 421, the power receiver 320 may transmit identification information to the power transmitter 310. Further, at operation 423, the power receiver 320 may transmit configuration information to the power transmitter 310. The identification and configuration phase 420 is a process of preparing wireless charging between the power transmitter 310 and the power receiver 320, and thereafter the wireless charging is performed. Although not shown in FIG. 4, in the identification and configuration phase 420, the power transmitter 310 may also transmit identification information to the power receiver 320.

According to an embodiment, in the power transfer phase 430, the power receiver 320 may receive power wirelessly from the power transmitter 310 and perform wireless charging. During the wireless charging process, the power receiver 320 may transmit at least one kind of data for wireless charging control to the power transmitter 310. For example, the power receiver 320 may transmit, to the power transmitter 310, control error packet (CEP) data 431, 433, 435, etc. to control power being transmitted during charging. In addition, the power receiver 320 may transmit, to the power transmitter 310, received power packet (RPP) data 432, 434, etc. for indicating received power information during charging. For reference, the above data 431 to 435 are merely denoted by names of representative packets or data and may further contain additional data.

According to an embodiment, in the power transfer phase 430, the power transmitter 310 may check the wireless charging state while transmitting power wirelessly. For example, using the first sensing circuit in the sensing circuit 314, the power transmitter 310 may check the temperature of the power transmitter 310 during wireless charging. Also, using the second sensing circuit in the sensing circuit 314, the power transmitter 310 may measure various signal in the transmission coil 311L, the matching circuit 311c, and/or the power generation circuit 311b, and thereby check the state of the power transmitter 310.

According to an embodiment, based on at least one of the data received from the power receiver 320 or the wireless charging state of the power transmitter 310, the power transmitter 310 may determine whether a reason to stop wireless charging has arisen. When such a reason arises, the power transmitter 310 may transmit data regarding the reason to the power receiver 320 at operation 436. Thereafter, at operation 437, the power transmitter 310 may receive, from the power receiver 320, an acknowledgment (ACK) that indicates the reception of the data regarding the reason. Specific examples of the reason to stop wireless charging will be described below with reference to FIG. 6. The sequence of operations shown in FIG. 4 is exemplary only, and for example the power transmitter 310 may perform the transmission of the data regarding the reason to stop wireless charging at any time before or after receiving the CEP data and/or the RPP data.

According to an embodiment, after a certain time period elapses from the reception of the ACK, the power transmitter 310 may stop the wireless power transfer. If the power transmitter 310 stops the wireless power transfer immediately after receiving the ACK from the power receiver 320, the power receiver 320 may not have sufficient time to prepare for the stop of wireless charging, which may cause charging instability.

Figure 5:
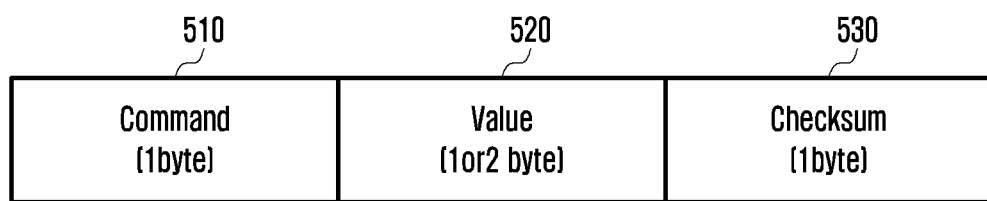
FIG. 5 is a diagram illustrating a data partition structure for indicating a reason for stopping wireless charging according to an embodiment of the present disclosure.

FIG. 5 is a diagram illustrating a data partition structure for indicating a reason for stopping wireless charging according to an embodiment of the present disclosure.

According to an embodiment, the data partition structure of the power transmitter (PTX) 310, which may be a packet structure for the reason to stop wireless charging may be shown in FIG. 5. The size of the packet shown in FIG. 5 is only exemplary and the present disclosure is not so limited.

According to an embodiment, the packet structure for the reason to stop wireless charging may include a command 510, a value 520, and a checksum 530. The command 510 may serve as the header of the packet. For example, the command 510 may be set to '0x05'. The value 520 may contain the substantive data regarding the reason to stop wireless charging. The checksum 530 may be used to verify whether the packet is correctly transmitted.

According to an embodiment, the power transmitter 310 may transmit data regarding the reason for stopping wireless charging through frequency shift keying (FSK) of the power transmitted to the power receiver 320. That is, while supplying power to the power receiver 320, the power transmitter 310 may transmit data regarding the reason for stopping wireless charging to the power receiver 320 via in-band communication using frequency shift keying. Accordingly, the power transmitter 310 does not need to use out-band communication involving a separate communication module in order to transmit the data regarding the reason to the power receiver 320.

But according to an alternative embodiment, the power transmitter 310 may also transmit data regarding the reason for stopping wireless charging to the power receiver 320 using out-band communication.

According to an embodiment, after receiving the CEP data, the RPP data, or other data on the charging state from the power receiver 320, the power transmitter 310 may transmit the data regarding the reason for stopping wireless charging to the power receiver 320. In this case, frequency variation for the frequency shift keying may be at least 1% of the transmission frequency. When an FSK packet is received from the power transmitter 310, the power receiver 320 may send, in response, an ACK packet to the power transmitter 310.

FIG. 6 is a diagram illustrating data representing the reason for stopping wireless charging according to an embodiment of the present disclosure.

According to an embodiment, FIG. 6 shows exemplary values (e.g., 520 of FIG. 5) in the packet used for transmission of the reason for stopping wireless charging and corresponding reasons. For example, when the power transmitter 310 has an overvoltage or overcurrent, or is overheating, the power transmitter 310 may recognize this as a reason to stop wireless charging. In another scenario, when foreign object is detected (FOD) between the power transmitters 310 and the power receiver 320, the power transmitter 310 may recognize the FOD as a reason to stop wireless charging stop. Thus, before stopping the power transfer, the power transmitter 310 may insert the value as shown in FIG. 6 in the packet used for transmission of the reason for stopping wireless charging and then transmit the packet to the power receiver 320.

According to an embodiment, when the value contained in the packet indicates '0x12', this means that the power transmitter 310 is overheated. For example, when a temperature greater than a predetermined temperature is detected through the sensing circuit 314 of the power transmitter 310, the power transmitter 310 may recognize this as it being overheated. Therefore, the power transmitter 310 may transmit the packet having the value of 0x12 to the power receiver 320 and, after an elapse of a predetermined time, stop the wireless power transfer.

According to an embodiment, when the value contained in the packet indicates '0x13', this means that the power transmitter 310 has an overcurrent. For example, when a current greater than a predetermined current is detected through the sensing circuit 314 of the power transmitter 310, the power transmitter 310 may recognize this as it having an overcurrent. Therefore, the power transmitter 310 may transmit the packet having the value of 0x13 to the power receiver 320 and, after an elapse of a predetermined time, stop the wireless power transfer.

According to an embodiment, when the value contained in the packet indicates '0x14', this means that the power receiver 320 is located in a zone incapable of wireless charging (i.e., a dark zone). For example, when the power receiver 320 is located in a peripheral region of the power transmitter 310, and not in the central region, intermittent failure in wireless charging may occur repeatedly or the power transmitter 310 may not be capable of generating the power required for wireless charging when the power receiver 320 is in such a location.

According to an embodiment, based on one or more types of information received from the power receiver 320, the power transmitter 310 may recognize that the power receiver 320 is located in the dark zone. For example, the information may include signal strength packet (SSP) information that indicates the degree of coupling between the coils 311L and 321L prior to wireless charging. In another example, the information may include received power packet (RPP) information or control error packet (CEP) information received from the power receiver 320. In still another example, the information may be frequency information for the current power transfer. When the power transmitter 310 recognizes that the power receiver 320 is located in the dark zone, the power transmitter 310 may transmit the packet having the value of 0x14 to the power receiver 320 and, after an elapse of a predetermined time, stop the wireless power transfer.

According to an embodiment, when the value contained in the packet used for transmission of the reason to stop wireless charging indicates one of '0x20' to '0x27', this means foreign object is detected (FOD) between the power transmitters 310 and the power receiver 320. In one embodiment, during the wireless charging process, the power receiver 320 may periodically transmit information regarding the amount of currently received power to the power transmitter 310 in the form of a received power packet (RPP). Then, the power transmitter 310 may compare the amount of received power received from the power receiver 320 with the amount of transmitted power transmitted by the power transmitter 310 and thereby identify the loss of power. If the power loss is greater than a predetermined level, the power transmitter 310 may determine that there is a foreign object between the power transmitter 310 and the power receiver 320.

According to an embodiment, different intervals of power loss may correspond to different values (0x20 to 0x27) in the packet, as shown in FIG. 6. The different values shown in FIG. 6 may be utilized for various purposes. For example, a smaller power loss interval (0x20) may be applicable to devices using less power such as a smartwatch, and a larger power loss interval (0x23) may be applicable to device using more power such as a smart phone.

Figure 7:
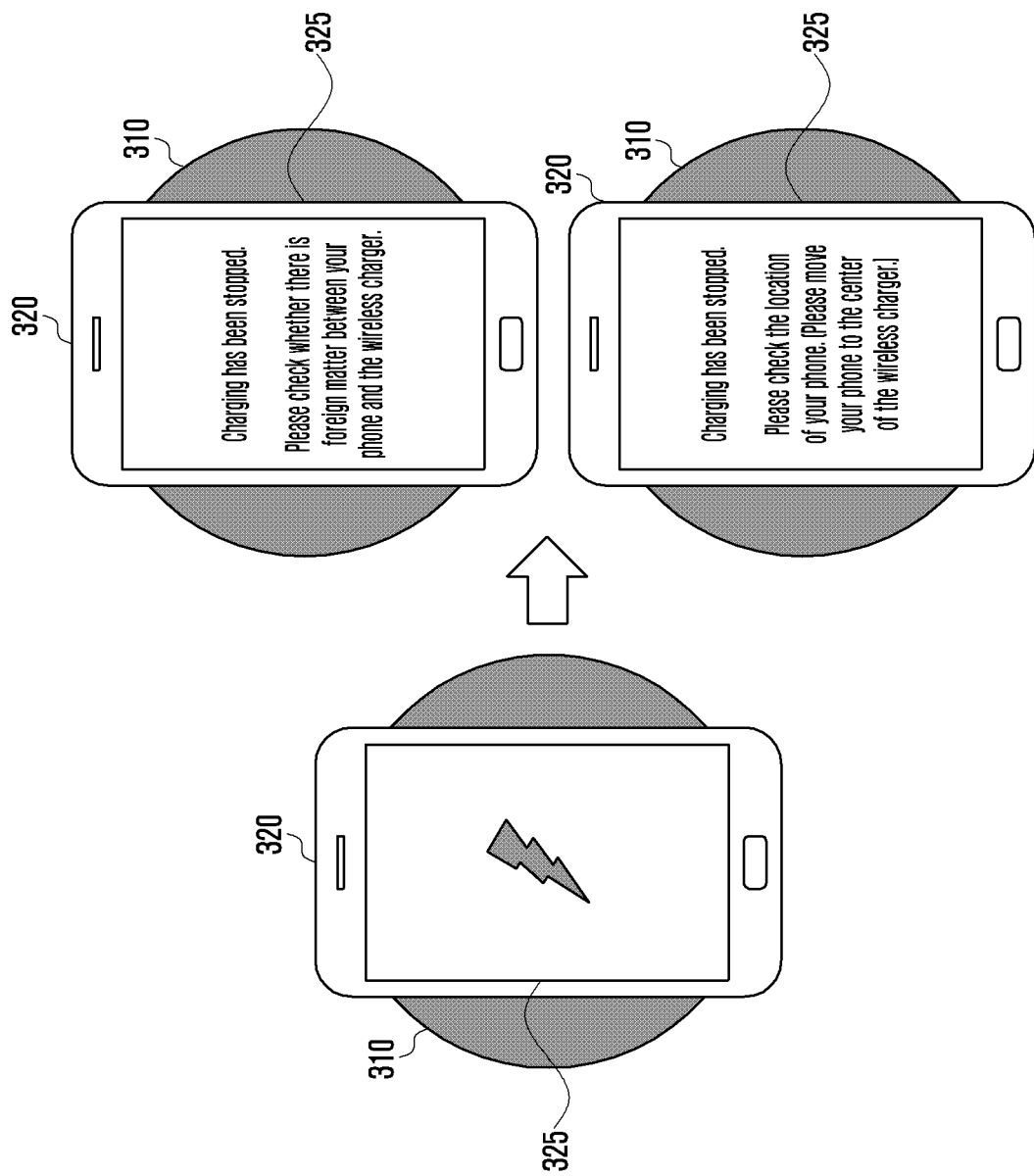
FIG. 7 is a diagram illustrating a method for outputting a reason to stop wireless charging of an electronic device according to an embodiment of the present disclosure.

FIG. 7 is a diagram illustrating a method for outputting a reason to stop wireless charging an electronic device according to an embodiment of the present disclosure.

According to an embodiment, as shown in FIG. 7, wireless charging may be performed when the power receiver 320 is in contact with or in proximity to the power transmitter 310. The display 325 of the power receiver 320 may output an image, text, etc. associated with the wireless charging. In particular, the power receiver 320 may receive a packet regarding a reason to stop wireless charging from the power transmitter 310 and, based on a value included in the received packet, may recognize the reason to stop wireless charging.

According to an embodiment, the power receiver 320 may output the reason to stop wireless charging corresponding to the value through the display 325 or the sound output device 155. For example, when the reason for stopping wireless charging is that a foreign object is detected, the power receiver 320 may provide the user with the following information: "Charging has been stopped. Please check whether there is foreign matter between your phone and the wireless charger." In another example, if the reason for stopping wireless charging is because the power receiver 320 is in the dark zone, the power receiver 320 may provide the user with the following information: "Charging has been stopped. Please check the location of your phone. (Please move your phone to the center of the wireless charger)"

Figure 8:
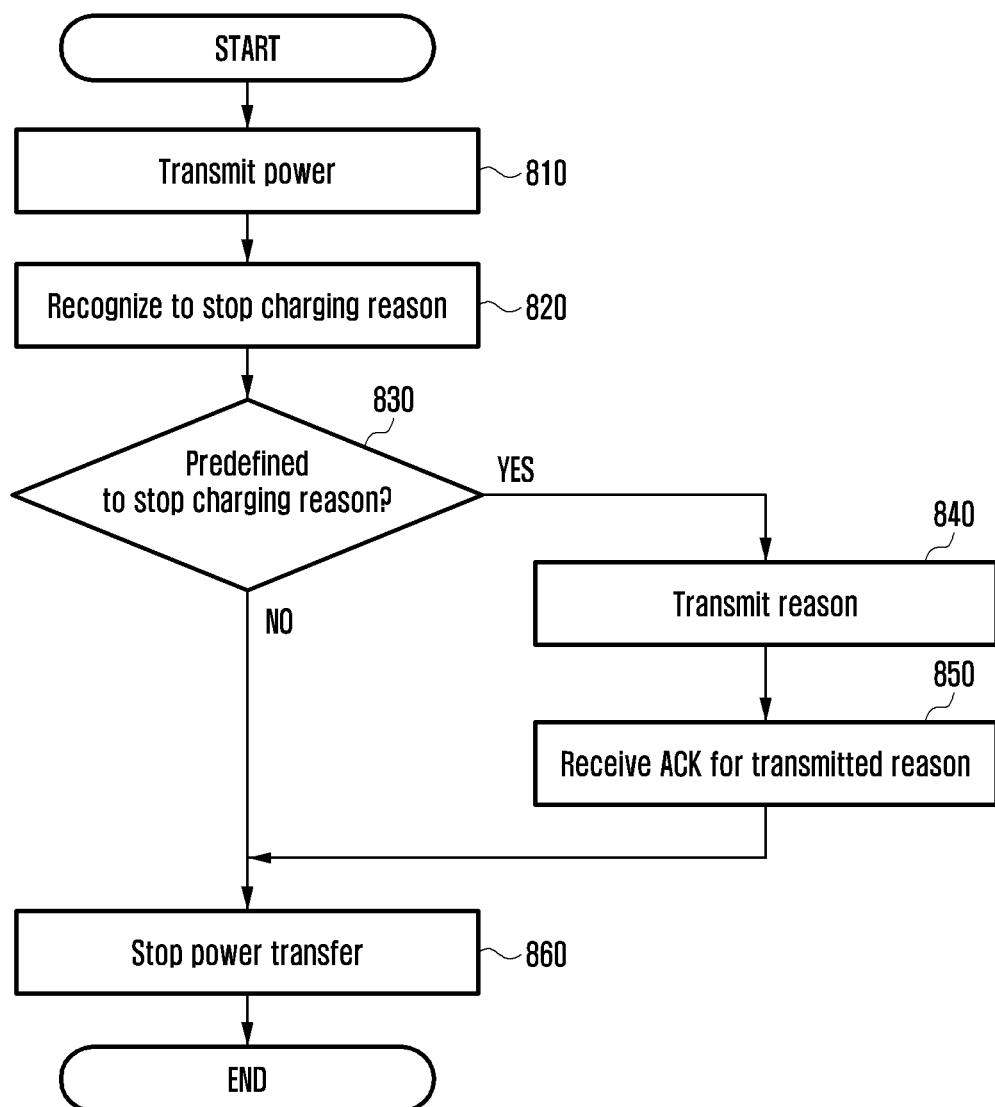
FIG. 8 is a flow diagram illustrating a method for transmitting a reason to stop charging and stopping power transfer at an external electronic device according to an embodiment of the present disclosure.

FIG. 8 is a flow diagram illustrating a method for transmitting a reason to stop charging and stopping power transfer at an external electronic device according to an embodiment of the present disclosure.

According to an embodiment, at operation 810, the external electronic device 102 (e.g., the power transmitter 310) may transmit power wirelessly to the electronic device 101 (e.g., the power receiver 320).

According to an embodiment, at operation 820, the external electronic device 102 may recognize that a reason to stop charging has arisen. The various reasons to stop charging are described earlier with reference to FIG. 6.

According to an embodiment, at operation 830, the external electronic device 102 may determine whether the reason that has arisen is a predefined reason. Specifically, the external electronic device 102 may determine whether the recognized reason to stop wireless charging is a predefined reason. For example, the external electronic device 102 may determine whether the recognized reason to stop wireless charging corresponds to one of the reasons shown in FIG. 6.

According to an embodiment, when the reason that has arisen is a predefined reason, the external electronic device 102 may transmit the reason to the electronic device 101 at operation 840. Specifically, the external electronic device 102 may insert a particular value 520 corresponding to the reason in a packet used for transmission of the reason to stop wireless charging and then transmit the packet to the electronic device 101.

According to an embodiment, when the reason is not a predefined reason, the external electronic device 102 may stop power transfer at operation 860. For example, in this case, the external electronic device 102 may immediately stop the power transfer without an elapse of a predetermined time period.

According to an embodiment, at operation 850, the external electronic device 102 may receive ACK data from the electronic device 101 with respect to the reason.

According to an embodiment, at operation 860, the external electronic device 102 may stop the power transfer after an elapse of a predetermined time period from the transmission of the reason to the electronic device 101 or from the reception of the ACK data from the electronic device 101. That is, the external electronic device 102 may delay a certain amount of time (e.g., about one second) before stopping the power transfer, so that the electronic device 101 has time to prepare for the end of the power transfer (e.g., deliver the reason to stop wireless charging to the AP such as the control circuit 322).

Figure 9:
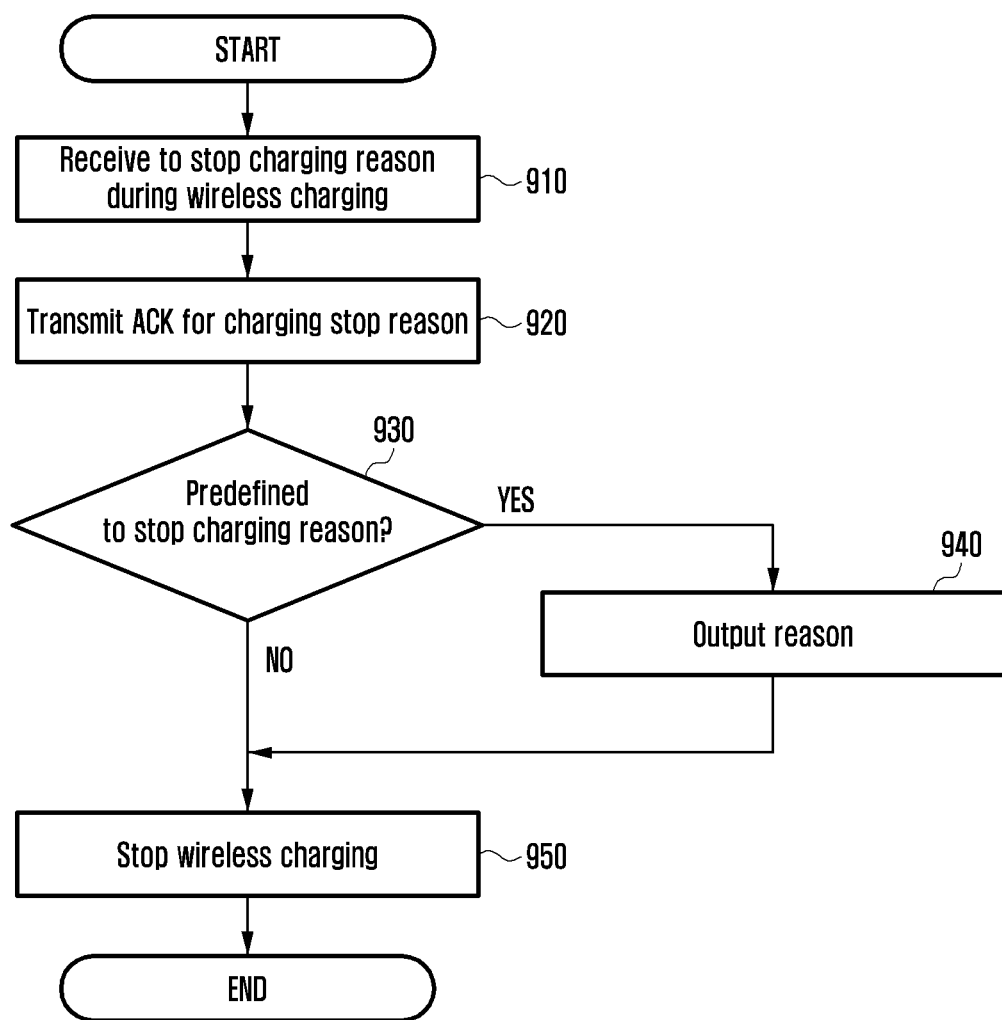
FIG. 9 is a flow diagram illustrating a method for receiving a reason to stop wireless charging and stopping wireless charging at an electronic device according to an embodiment of the present disclosure.

FIG. 9 is a flow diagram illustrating a method for receiving a reason to stop wireless charging and stopping wireless charging at an electronic device according to an embodiment of the present disclosure.

According to an embodiment, at operation 910, the electronic device 101 (e.g., the power receiver 320) may receive a reason to stop charging from the external electronic device 102 (e.g., the power transmitter 310) during wireless charging. The reason to stop charging is described earlier with reference to FIG. 6.

According to an embodiment, at operation 920, the electronic device 101 may transmit ACK data to the external electronic device 102 in response to the reception of the reason.

According to an embodiment, at operation 930, the electronic device 101 may determine whether the reason is a predefined reason. Specifically, the electronic device 101 may determine whether the recognized reason to stop wireless charging is a predefined reason. For example, the electronic device 101 may determine whether the reason received from the external electronic device 102 at the operation 910 corresponds to one of the reasons shown in FIG. 6.

According to an embodiment, when the received reason is a predefined reason, the electronic device 101 may provide the reason to the user of the electronic device 101 at operation 940. For example, the electronic device 101 may provide the user with the reason using the display device 160 or the sound output device 155 so that the user can be aware of why wireless charging has stopped. In addition, the electronic device 101 may perform a function of guiding the user so that the same problem does not recur in the future. In addition, the electronic device 101 may analyze the reason to stop wireless charging to improve the electronic device 101 or the external electronic device 102 for smoother wireless charging.

According to an embodiment, when the received reason is not a predefined reason, or after the reason is provided to the user, the electronic device 101 may stop the power transfer at operation 950.

According to an embodiment, an electronic device may comprise a display; a power reception circuit; and a processor configured to perform wireless charging by receiving power wirelessly from an external electronic device through the power reception circuit, receive data on one or more reasons to stop wireless charging from the external electronic device during the wireless charging, transmit acknowledge (ACK) data to the external electronic device in response to receiving the data on the one or more reasons to stop wireless charging, and display, through the display, at least one reason to stop wireless charging included in the data on the one or more reasons to stop wireless charging.

The processor may be further configured to use a first frequency for the wireless charging, and use a same frequency as the first frequency for reception of the data on the one or more reasons to stop wireless charging.

The processor may be further configured to stop the wireless charging after elapse of a predetermined time period from transmission of the ACK data to the external electronic device.

The processor may be further configured to transmit, to the external electronic device during the wireless charging, at least one of received power packet (RPP) data for indicating the power received from the external electronic device and control error packet (CEP) data for controlling the power received from the external electronic device.

The one or more reasons to stop wireless charging may include at least one of overheating of the external electronic device, overcurrent of the external electronic device, foreign object detection between the external electronic device and the electronic device, and a state in which the electronic device is located in a dark zone where the wireless charging at least intermittently fails.

The foreign object may be detected when a power loss identified by comparing received power packet (RPP) data for indicating the power received from the external electronic device with power transmitted by the external electronic device is greater than a predetermined level.

The state in which the electronic device is located in the dark zone may be determined based on at least one of signal strength packet (SSP) data indicating a degree of coupling between coils equipped respectively in the electronic device and the external electronic device, frequency data of the wireless charging, received power packet (RPP) data for indicating the power received from the external electronic device, and control error packet (CEP) data for controlling the power received from the external electronic device.

The electronic device may further comprise a sound output device, wherein the processor is further configured to output the at least one reason to stop wireless charging through the sound output device.

The data on the one or more reasons to stop wireless charging may be in the form of a packet which includes a value indicating the at least one reason to stop wireless charging.

According to an embodiment, a method performed by an electronic device may comprise performing wireless charging by receiving power wirelessly from an external electronic device through a power reception circuit; receiving data on one or more reasons to stop wireless charging from the external electronic device during the wireless charging; transmitting acknowledge (ACK) data to the external electronic device in response to the receiving the data on the one or more reasons to stop wireless charging; and displaying, through a display, at least one reason to stop wireless charging included in the data on the one or more reasons to stop wireless charging.

The method may further comprise stopping the wireless charging after elapse of a predetermined time period from the transmitting of the ACK data to the external electronic device.

The method may further comprise transmitting, to the external electronic device during the wireless charging, at least one of received power packet (RPP) data for indicating the power received from the external electronic device and control error packet (CEP) data for controlling the power received from the external electronic device.

In the method, the one or more reasons to stop wireless charging may include at least one of overheating of the external electronic device, overcurrent of the external electronic device, foreign object detection between the external electronic device and the electronic device, and a state in which the electronic device is located in a dark zone where the wireless charging at least intermittently fails.

In the method, the state in which the electronic device is located in the dark zone may be determined based on at least one of signal strength packet (SSP) data indicating a degree of coupling between coils equipped respectively in the electronic device and the external electronic device, frequency data of the wireless charging, received power packet (RPP) data for indicating the power received from the external electronic device, and control error packet (CEP) data for controlling the power received from the external electronic device.

In the method, the data on the one or more reasons to stop wireless charging may be in the form of a packet which includes a value indicating the at least one reason to stop wireless charging.

According to an embodiment, an electronic device may comprise a power transmission circuit; and a processor configured to perform wireless power transfer by transmitting power wirelessly to an external electronic device through the power transmission circuit, detect a reason to stop wireless charging during the wireless power transfer, transmit data on the reason to stop wireless charging to the external electronic device, and stop the wireless power transfer after elapse of a first predetermined time period from the transmitting of the data on the reason to stop wireless charging.

The processor may be further configured to receive acknowledge (ACK) data from the external electronic device, the ACK data indicating that the external electronic device has received the data on the reason to stop wireless charging, and stop the wireless power transfer after elapse of a second predetermined time period from the receiving of the ACK data.

The processor may be further configured to use a first frequency for the wireless power transfer, and use a same frequency as the first frequency for transmission of the data on the reason to stop wireless charging.

The processor may be further configured to acquire data on power received by the external electronic device from the external electronic device, and recognize foreign object detection as the reason to stop wireless charging, based on comparing the data on the power received by the external electronic device with the power transmitted by the electronic device.

The electronic device may further comprise a sensing circuit, wherein the processor is further configured to recognize overheating as the reason to stop wireless charging when a temperature sensed through a first sensor of the sensing circuit is greater than a predetermined temperature, and recognize overcurrent as the reason to stop wireless charging when a current sensed through a second sensor of the sensing circuit is greater than a predetermined current.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An electronic device comprising:
a display;
a power reception circuit; and
a processor configured to:
perform wireless charging by receiving power wirelessly from an external electronic device through the power reception circuit,
alternatingly transmit, to the external electronic device during the wireless charging, control error packet (CEP) data for controlling the power received from the external electronic device and received power packet (RPP) data for indicating the power received from the external electronic device,
receive, from the external electronic device, a packet having a value indicating one or more reasons to stop wireless charging, and
display, through the display, the one or more reasons to stop wireless charging based on the packet,
wherein the value included in the packet comprises:
a first value indicating a reason to stop wireless charging to be a location of the electronic device and the location of the electronic device to be an area of the external electronic device at least intermittently incapable of wireless charging, or
a second value indicating one of overheating of the external electronic device, and overcurrent of the external electronic device.

2. The electronic device of claim 1, wherein the processor is further configured to:
use a first frequency for the wireless charging, and
use a same frequency as the first frequency for reception of the packet having the value indicating the reason to stop wireless charging.

3. The electronic device of claim 1, wherein the processor is further configured to:
transmit acknowledge (ACK) data to the external electronic device in response to receiving the packet having the value indicating the one or more reasons to stop wireless charging, and
stop the wireless charging after elapse of a predetermined time period from transmission of the ACK data to the external electronic device.

4. The electronic device of claim 1, wherein the reason to stop wireless charging further includes foreign object detection between the external electronic device and the electronic device.

5. The electronic device of claim 4, wherein the foreign object is detected when a power loss identified by comparing the received power packet (RPP) data for indicating the power received from the external electronic device with power transmitted by the external electronic device is greater than a predetermined level.

6. The electronic device of claim 1, wherein the location of the electronic device to be the area of the external electronic device at least intermittently incapable of wireless charging is determined based on at least one of signal strength packet (SSP) data indicating a degree of coupling between coils equipped respectively in the electronic device and the external electronic device, frequency data of the wireless charging, the received power packet (RPP) data for indicating the power received from the external electronic device, and the control error packet (CEP) data for controlling the power received from the external electronic device.

7. The electronic device of claim 1, further comprising:
a sound output device,
wherein the processor is further configured to output the reason to stop wireless charging through the sound output device.

8. A method performed by an electronic device, the method comprising:
performing wireless charging by receiving power wirelessly from an external electronic device through a power reception circuit;
alternatingly transmitting, to the external electronic device during the wireless charging, control error packet (CEP) data for controlling the power received from the external electronic device and received power packet (RPP) data for indicating the power received from the external electronic device;
receiving, from the external electronic device, a packet having a value indicating one or more reasons to stop wireless charging; and
display, through the display, the one or more reasons to stop wireless charging based on the packet,
wherein the value included in the packet comprises:
a first value indicating a reason to stop wireless charging to be a location of the electronic device and the location of the electronic device to be an area of the external electronic device at least intermittently incapable of wireless charging, or
a second value indicating one of overheating of the external electronic device, and overcurrent of the external electronic device.

9. The method of claim 8, further comprising:
transmitting acknowledge (ACK) data to the external electronic device in response to the receiving the packet having the value indicating the one or more reasons to stop wireless charging; and
stopping the wireless charging after elapse of a predetermined time period from the transmitting of the ACK data to the external electronic device.

10. The method of claim 8, wherein the reason to stop wireless charging further includes foreign object detection between the external electronic device and the electronic device.

11. The method of claim 8, wherein the location of the electronic device to be the area of the external electronic device at least intermittently incapable of wireless charging based on at least one of signal strength packet (SSP) data indicating a degree of coupling between coils equipped respectively in the electronic device and the external electronic device, frequency data of the wireless charging, the received power packet (RPP) data for indicating the power received from the external electronic device, and the control error packet (CEP) data for controlling the power received from the external electronic device.

12. An electronic device comprising:
a power transmission circuit; and
a processor configured to:
perform wireless power transfer by transmitting power wirelessly to an external electronic device through the power transmission circuit,
alternatingly receive, from the external electronic device during the wireless power transfer, control error packet (CEP) data for controlling the power received by the external electronic device and received power packet (RPP) data for indicating the power received by the external electronic device,
detect a reason to stop wireless charging during the wireless power transfer,
transmit, to the external electronic device, a packet having a value indicating one or more reasons to stop wireless charging,
wherein the value included in the packet comprises:
a first value indicating a reason to stop wireless charging to be a location of the electronic device and the location of the electronic device to be an area of the external electronic device at least intermittently incapable of wireless charging, or
a second value indicating one of overheating of the external electronic device, and overcurrent of the external electronic device.

13. The electronic device of claim 12, wherein the processor is further configured to:
receive acknowledge (ACK) data from the external electronic device, the ACK data indicating that the external electronic device has received the value, and
stop the wireless power transfer after elapse of a second predetermined time period from the receiving of the ACK data.

14. The electronic device of claim 12, wherein the processor is further configured to:
use a first frequency for the wireless power transfer, and
use a same frequency as the first frequency for transmission of packet having the value indicating the one or more reasons to stop wireless charging.

15. The electronic device of claim 12, wherein the processor is further configured to:
recognize foreign object detection as the reason to stop wireless charging, based on comparing the received power packet (RPP) data for indicating the power received by the external electronic device with the power transmitted by the electronic device.

16. The electronic device of claim 12, further comprising:
a sensing circuit, wherein the processor is further configured to:
recognize overheating as the reason to stop wireless charging when a temperature sensed through a first sensor of the sensing circuit is greater than a predetermined temperature, and
recognize overcurrent as the reason to stop wireless charging when a current sensed through a second sensor of the sensing circuit is greater than a predetermined current.

* * * * *